3,304,317
PREPARATION OF ALKYL BROMIDES AND
DIALKYL ALUMINUM CYANIDES
Gordon D. Brindell, Wayne, N.J., and David W. Marshall,
Ponca City, Okla., assignors to Continental Oil Company, Ponca City, Okla., a corporation of Delaware
No Drawing. Filed Dec. 11, 1961, Ser. No. 158,570
9 Claims. (Cl. 260—448)

This invention relates to an improved process for the preparation of alkyl bromides. More particularly, the present invention concerns a process for the preparation of 1-bromoalkanes comprising reacting a trialkyl aluminum compound with bromocyanogen. The invention further relates to a method for preparing dialkyl aluminum cyanides.

The alkyl bromides derived in the practice of this invention represent valuable compounds in the chemical industry wherein they are used mainly as intermediates. Their principal use is as alkylating agents; especially for reacting with tertiary amines to produce quaternary compounds having utility in a variety of applications. It is well known that quaternary compounds of the type indicated are extremely effective germicidal and fungicidal agents. This activity of such compounds is particularly evident where the alkylating agent used in preparing the quaternary is an alpha bromo-substituted higher linear alkane having from about 12 to 20 carbon atoms. These quaternary compounds are additionally useful as cationic surface-active chemicals. Accordingly, because of their pronounced bactericidal properties in combination with surface active characteristics, they are admirably adapted for use in oil field flooding operations. Additionally, these compounds are useful as antistatic agents and as adjuvants for improving the qualities of paper and textile materials.

Heretofore, the principal method observed in preparing 1-bromoalkanes consisted of reacting the corresponding alcohol with hydrobromic acid. It is to be readily appreciated that this method of preparation is comparatively expensive in so far as the alcohol starting materials represent very desirable chemicals in themselves.

We have found by the present invention a novel manner of preparing 1-bromoalkanes in an economical fashion. In accordance with our process, readily obtainable alkyl aluminum compounds are reacted with bromocyanogen which reaction, quite unexpectedly, results in the formation of the desired alkyl bromide in excellent yields. More details with respect to the reaction involved will best be delayed until after we have set forth a description of the aluminum compounds useful in the practice of our invention and a brief discussion of how they may be obtained.

The stated aluminum compounds can be easily derived by reacting either triethyl aluminum or tripropyl aluminum with ethylene under conditions so as to induce the well known growth reaction. This growth reaction is depicted schematically by the following equation in which triethyl aluminum is illustratively set forth as the starting aluminum compound:

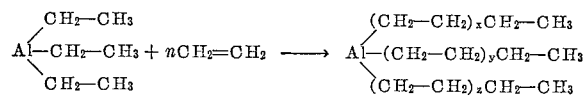

where $x$, $y$ and $z$ are an integer ranging up to about 50 and where $x+y+z=n$.

The reaction in accordance with the above equation can be conveniently carried out by continuously introducing the ethylene into the triethyl aluminum preferably in the presence of a nonreactive diluent capable of dissolving the reactants. A wide variety of reaction conditions can be utilized to accomplish the growth reaction. For example, a temperature within the range of about 65 to 150° C. and a pressure within the range of from about 200 to 5000 p.s.i. can be used. More preferable limits of these respective conditions include a temperature range of from 90 to 120° C. and a pressure range from about 1000 to 3500 p.s.i.

The product of the growth reaction is a complex mixture of various aluminum trialkyls wherein the composition of the alkyl moiety follows a statistical distribution known as the Poisson distribution. Generally, in such a distribution, the alkyl content will be peaked at about $2m+2$ carbon atoms where $m$ is the mean number of additions of ethylene. The addition of the ethylene during the growth reaction is controlled by regulating the amount of total ethylene introduced into the reaction sphere.

The products of the above-described growth reaction can be used as such in the practice of our process. When using a growth product, the resultant alkyl bromide product will comprise a mixture of such halides wherein the alkyl substituents substantially correspond to the statistical distribution observed for the product employed. The mixture of alkyl bromides can then be readily fractionated to any extent desired. It is, of course, obvious that when triethyl aluminum is used in the growth reaction, the resultant growth product will contain only even numbered carbon atoms. Where it is desired to obtain aluminum alkyls containing an odd number of carbon atoms, one can employ tripropyl aluminum as the starting material.

An alternative way of preparing the trialkyl aluminum compounds useful herein consists of reacting aluminum (triisobutyl) with an alpha olefin. This reaction is preferably carried out in three stages whereby the aluminum compound is successively converted to the monohydride form with the evolution of isobutylene followed in each instance by reaction of the mono-hydride with the olefin. While we prefer this stage-wise procedure, it is nevertheless mentioned that U.S. Patent 2,835,689 discloses a method for directly converting the triisobutyl aluminum. In preparing the tri-substituted aluminum compounds in this manner, any alpha olefin can be used and, of course, branch chain and aryl substituted alpha olefins, e.g., styrene, are applicable.

The reaction underlying the process of this invention can be expressed diagrammatically as follows:

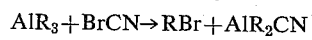

$$AlR_3 + BrCN \rightarrow RBr + AlR_2CN$$

wherein R is a linear alkyl substituent having not in excess of about 50 carbon atoms and more preferably from 2 to about 20 carbon atoms. This reaction can be effectively carried out over the temperature range of from about 0 to 125° C. Atmospheric pressure is generally observed, although super- and sub-atmospheric conditions are applicable. The reaction is an exothermic one, so consequently, it is desirable to conduct same where cooling can be observed if needed. A preferred temperature range is from about 0 to 50° C. The process is best facilitated by adding the aluminum trialkyl to a solution of bromocyanogen. The presence of the solvent is desirable, particularly when carrying out the reaction within the preferred temperature range. Suitable solvents include any one of a number of normal paraffins or ether. Of the normal paraffins, hexane is particularly useful for this purpose.

The reaction medium is desirably agitated during the addition of the trialkyl aluminum and for a brief period subsequent thereto. Suitable relative proportions of aluminum alkyl to cyanogen bromide range from about 1:1 to 1:3, respectively, on a molar basis. While not essential, it is nevertheless preferred to maintain the mixture under reaction conditions for a time following the addition of the aluminum alkyl ranging from about one-half to two hours.

In common with many other double decomposition-type reactions involving the use of a trialkyl aluminum as a reactant, substantially only one of the alkyl groups is readily replaceable. We are not aware at present of any conditions which will significantly induce the reaction of the remaining alkyl groups associated in the aluminum compound. However, this limitation poses no real economic disadvantage as the spent dialkyl aluminum cyanide can be readily converted to the alkoxide form which upon hydrolysis yields the corresponding alcohols. Additionally, the dialkyl aluminum cyanides per se are useful. For example, they represent effective polymerization catalyst. In those instances where the process of this invention is practiced with the primary objective of obtaining dialkyl aluminum cyanides, the employment of the lower alkyl aluminum compounds therein is especially beneficial. As specific examples of such aluminum compounds, there are: triethyl aluminum, tripropyl aluminum, tributyl aluminum, triamyl aluminum, trihexyl aluminum, etc.

The alkyl bromide can be recovered from the reaction mixture by vacuum stripping. Alternatively, of course, the reaction mixture can be hydrolyzed and the bromide separated from the hydrolysis mixture by fractionation.

As mentioned above, in most instances it will be desirable to further oxidize the dialkyl aluminum cyanide in order to prepare the dialkoxide. The oxidation procedure applicable for achieving the foregoing is conventional in the art and generally consists of bubbling oxygen or air through the dialkyl aluminum cyanide, or more preferably, an inert hydrocarbon solution thereof, until the alkyl radicals are substantially completely converted to the alkoxide form. The temperatures that can be used in the oxidation procedure ordinarily range from 0–90° C. but somewhat higher temperatures can also be used. The oxidation may be carried out at atmospheric or super-atmospheric pressures.

The oxidized product can be easily hydrolyzed in order to prepare the alcohol corresponding to the alkoxide group. Any one of a number of hydrolyzing agents can be used for this purpose. Representative of such agents include: hydrochloric acid, sulfuric acid, nitric acid, sodium hydroxide, potassium hydroxide, etc. These agents are added to the oxidized product in the form of aqueous solutions. Following the hydrolysis reaction, the mixture can then be steam-stripped of the alcohol whereupon the alcohol-containing distillate is permitted to stand to yield an aqueous phase and an alcohol-(solvent) layer.

In order that the present invention may be more fully understood, the following examples are set forth. These examples are given primarily by way of illustration and any enumeration of details should not be interpreted as limitations except as indicated in the appended claims. All parts are parts by weight unless otherwise stated.

*Example I*

Into a suitable reaction vessel equipped with a thermometer, stirrer and means for cooling the contents of the reactor, were charged 10.6 parts of cyanogen bromide and 66 parts of n-hexane. Stirring was commenced and the solution of the cyanogen bromide was cooled to about 10° C. whereupon aluminum (tri-n-octyl) in the amount of 12.1 parts was slowly added at a uniform rate to the reaction vessel. The aluminum compound was added over a period of 30-minutes. During this addition, the temperature rose gradually to 15° C. Upon completion of the addition of the aluminum alkyl, the reaction mixture was post-stirred and the temperature was allowed to rise to 41° C. When a flocculent precipitate occurred after 15-minutes of additional stirring, the temperature fell to 25° C. The reaction mixture was then carefully hydrolyzed using hydrochloric acid. The precipitate disappeared upon hydrolysis. An organic layer was recovered in the amount of 72.3 parts. Analysis showed its composition to be the following:

| | Percent |
|---|---|
| n-Octyl bromide | 7.85 |
| n-Octane | 12.24 |
| n-Hexane | 76.3 |

No octyl cyanide was found. The yield of octyl bromide was 5.6 parts or 88% of theoretical for reaction of one alkyl equivalent. The recovery of octyl groups (n-octyl bromide and n-octane) was quantitative.

*Example II*

To a reaction vessel such as described in Example I were charged 21.2 parts of cyanogen bromide and 100 parts of dried ether. 24.2 parts of aluminum (tri-n-octyl) were uniformly added to the reaction vessel over a period of 45-minutes. During this addition, the temperature of the reaction was maintained between −5 to +5° C. After poststirring for a brief interval, the reaction mixture was hydrolyzed. Analysis indicated that octyl bromide was formed in about 40% yield (33% being theoretical for replacement of one alkyl group).

One-bromododecane, 1-bromotetradecane, 1-bromohexadecane, and 1-bromooctadecane can be prepared from aluminum tri-(n-dodecyl), aluminum tri-(n-tetradecyl), aluminum tri-(n-hexadecyl), and aluminum tri-(n-octadecyl), respectively, by reaction of the aluminum compound with bromocyanogen in accordance with the procedure disclosed in the instant example, as well as that exemplified in Example I.

We claim:

1. A process for preparing a mixture of an alkyl bromide and a dialkyl aluminum cyanide which comprises reacting an aluminum trialkyl having alkyl substituents containing not in excess of about 50 carbon atoms with bromocyanogen at a temperature between about 0° and 125° C.

2. A process for preparing a 1-bromoalkane which comprises reacting an aluminum trialkyl having linear alkyl substituents containing not in excess of about 50 carbon atoms with bromocyanogen at a temperature between about 0° and 125° C.

3. A process for preparing a 1-bromoalkane which comprises reacting an aluminum trialkyl having linear alkyl substituents containing from 2 to about 20 carbon atoms with bromocyanogen at a temperature between about 0° and 125° C.

4. A process for preparing a 1-bromoalkane which comprises reacting about one mole of an aluminum trialkyl having linear alkyl substituents containing from 2 to about 20 carbon atoms with from about one to three moles of bromocyanogen at a temperature between about 0° to 50° C.

5. A process for preparing 1-bromooctane which comprises reacting aluminum tri(n-octyl) with from about one to three moles of bromocyanogen at a temperature between about 0° and 50° C.

6. A process for preparing 1-bromododecane which comprises reacting aluminum tri(n-dodecyl) with from about one to three moles of bromocyanogen at a temperature between about 0° and 50° C.

7. A process for preparing 1-bromotetradecane which comprises reacting aluminum tri(n-tetradecyl) with from about one to three moles of bromocyanogen at a temperature between about 0° and 50° C.

8. A process for preparing 1-bromohexadecane which comprises reacting aluminum tri(n-hexadecyl) with from about one to three moles of bromocyanogen at a temperature between about 0° and 50° C.

9. A process for preparing 1-bromooctadecane which comprises reacting aluminum tri(n-octadecyl) with from about one to three moles of bromocyanogen at a temperature between about 0° and 50° C.

References Cited by the Examiner

UNITED STATES PATENTS 2,944,948 7/1960 Giraitis _____ 260—448

OTHER REFERENCES

Grignard et al., Annales de Chimie (9), vol. 4, 28–32 (1915).

Woolf, Chemical Society Journal (London), 1954, Pt. 1, pp. 252–65.

HELEN M. McCARTHY, *Acting Primary Examiner.*

A. LOUIS MONACELL, *Examiner.*

I. R. PELLMAN, H. M. S. SNEED, *Assistant Examiners.*